United States Patent

[11] 3,602,758

| [72] | Inventors | William A. Thornton<br>Cranford;<br>Joseph W. Sausville, Glen Rock, both of, N.J. |
|---|---|---|
| [21] | Appl. No. | 835,076 |
| [22] | Filed | June 20, 1969 |
| [45] | Patented | Aug. 31, 1971 |
| [73] | Assignee | Westinghouse Electric Corporation<br>Pittsburgh, Pa. |

[54] PHOSPHOR BLEND LAMPS WHICH REDUCE THE PROPORTIONS OF THE COSTLIER PHOSPHORS
7 Claims, 4 Drawing Figs.

[52] U.S. Cl. .................................................. 313/109, 313/184
[51] Int. Cl. ..................................................... H01j 61/44
[50] Field of Search ............................................ 313/109, 184

[56] References Cited
UNITED STATES PATENTS

| 2,103,085 | 12/1937 | McKeag et al. ............... | 313/109 |
| 2,135,732 | 11/1938 | Randall et al. ................. | 313/109 |
| 2,424,454 | 7/1947 | Gordon ........................... | 313/109 |
| 2,452,518 | 10/1948 | Burns ............................... | 313/109 X |
| 2,494,883 | 1/1950 | Kroger et al. .................. | 313/109 |
| 3,114,067 | 12/1963 | Henderson ..................... | 313/109 |
| 3,409,792 | 11/1968 | Martyn et al. ................. | 313/109 |
| 3,417,027 | 12/1968 | Wanmaker et al. ............ | 313/109 X |

OTHER REFERENCES

FLUORESCENT LAMPS AND LIGHTING, by Elenbaas et al., Chapter II, section 2.3, pages 18-23 and Chapter III, sections 3.9-3.12, pages 58-64, 1962, copy of book in AU 252

*Primary Examiner*—Roy Lake
*Assistant Examiner*—Palmer C. Demeo
*Attorneys*—A. T. Stratton, W. D. Palmer and Walter Sutcliff ABSTRACT: An improved luminescent combination wherein the emissions of distinct luminescent materials are blended to provide a predetermined spectral energy distribution for the combination. When one of the blend constituents is particularly expensive, the requisite amount of this material can be substantially reduced by providing a plurality of luminescent layers with the expensive material being disposed as the layer nearest the source of ultraviolet radiations. This increases the absorption of ultraviolet radiations by this expensive material and its corresponding emission. The desired spectral energy distribution for the combination can be provided with substantially less of the most expensive luminescent material.

PATENTED AUG31 1971 3,602,758

WITNESSES
Theodore F. Wrobel
James F. Young

INVENTORS
William A. Thornton
and Joseph W. Sausville
BY Walter Sutcliff
ATTORNEY

PHOSPHOR BLEND LAMPS WHICH REDUCE THE PROPORTIONS OF THE COSTLIER PHOSPHORS

BACKGROUND OF THE INVENTION

The use of several luminescent materials having distinct spectral energy distributions as blend constituents for a combination having a predetermined overall spectral energy distribution is well known. Of course, an approximately white light with maximum lumens output is the preferred combination. In most instances the blend combination has been prepared by merely mixing the distinct luminescent materials and disposing them as a single layer, for example on the interior of a standard fluorescent lamp, or on the interior wall of a high-pressure mercury vapor device.

The provision of distinct coatings of different phosphors on the backplate and frontplate of a panel-fluorescent lamp is taught by U.S. Pat. No. 3,409,792.

It has been determined that the major portion of the ultraviolet radiation generated in a fluorescent lamp is absorbed by a relatively minor portion of the phosphor material, i.e. that which is disposed nearest the source of the radiation. This phosphor material which absorbs a disproportionate share of the ultraviolet radiation likewise emits with a proportionately higher fluorescent intensity than the rest of the phosphor material.

SUMMARY OF THE INVENTION

It is an object of the present invention to provide an improved discharge lamp combination having a predetermined desired spectral energy distribution, which is provided by the blended output of particular luminescent materials, and to reduce the amount required of a more expensive component while maintaining the desired spectral energy distribution for the combination.

This object is achieved by disposing the luminescent materials as a plurality of uniform layers on said substrate, with one or more base layers of the less expensive material being disposed on the substantially light transmissive substrate, and the more expensive material disposed as a distinct, separate top layer over the base layer or layers. The top layer is nearest the discharge and the ultraviolet radiations emanating therefrom.

The top layer comprising more expensive material absorbs a greater percentage of the ultraviolet radiation with a consequent increase in the fluorescent intensity of the light emitted by this more expensive material. The preferred embodiment of the invention is to provide a plurality of distinct luminescent layers on the interior surface of a conventional, elongated, tubular, low-pressure mercury discharge device.

DESCRIPTION OF THE PREFERRED EMBODIMENT

Figure 1:
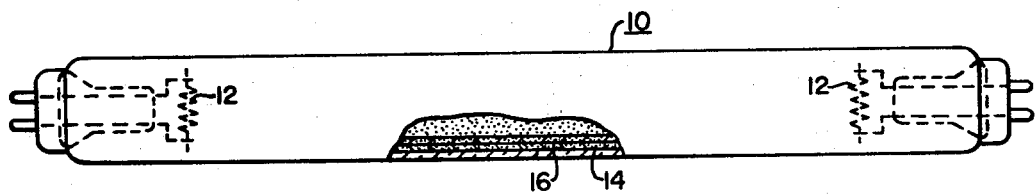
FIG. 1 is an elevation partly in section of a low-pressure mercury discharge device coated per the invention.

The invention can be best explained by reference to the low-pressure mercury vapor fluorescent lamp shown in FIG. 1, wherein a conventional, elongated, tubular, soda-lime glass envelope 10 has operative discharge sustaining electrodes 12 at opposite ends. The discharge sustaining filling comprises mercury and an inert gas filling as is well known in the art. A first layer 14 of luminescent material is disposed on the interior or surface of the envelope 10. A second distinct layer 16 of another luminescent material is disposed on the first layer 14.

As is well known in the art a low-pressure mercury discharge produces mercury resonance radiation which has a significant ultraviolet component. It is this ultraviolet component, primarily at 254 nanometers, which excites the luminescent materials to emit visible radiations by fluorescence.

In practicing the present invention the distinct luminescent layers permit the expensive luminescent material which is nearest the ultraviolet source to absorb a greater proportion of the ultraviolet radiation that would be absorbed by the same weight of that phosphor mixed in a blend as is usually done, and when using a blend of luminescent materials to produce a predetermined spectral energy distribution for the combination one of the luminescent materials may be particularly expensive. It has been determined that by disposing this very expensive blend component as a distinct layer which is first impinged upon by the ultraviolet radiation, that the requisite amount of this component needed to provide the predetermined spectral energy distribution for the blend combination is significantly reduced.

Figure 3:
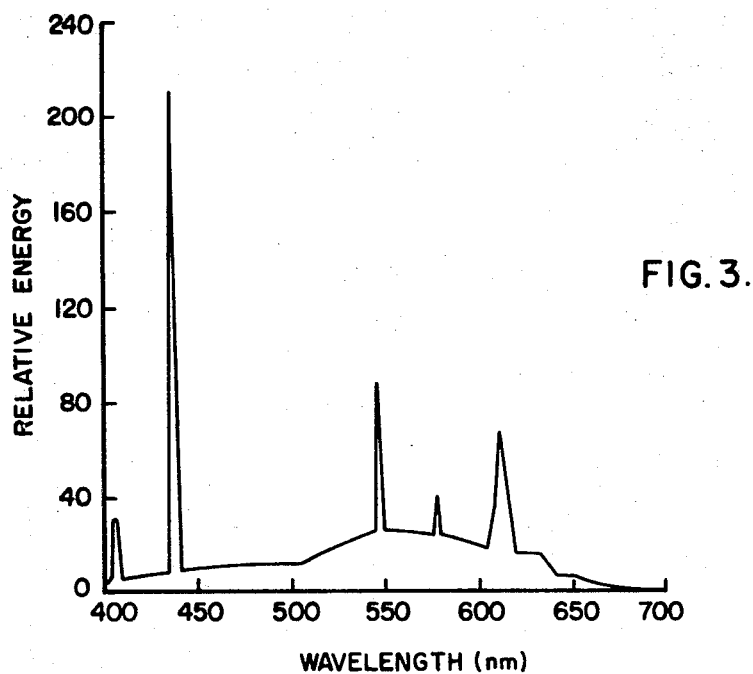
FIG. 3 is a graph of the spectral energy distribution for one embodiment of the present invention, with relative emission energy plotted against wavelength in nanometers.

As a particular example of the invention when the predetermined spectral energy distribution desired is what is termed "Living White" light, as shown in FIG. 3 with chromaticity coordinates $x=0.366$, $y=0.376$, $z=0.258$, and a color temperature of approximately 4400° Kelvin, a blend of the following well-known standard phosphor components has been used; for a 40 watt T–12 bulb about 1.78 mg. per cm$^2$, of strontium magnesium phosphate, tin activated; about 2.3 mg. per cm$^2$ of strontium blue halophosphate, activated by antimony; about 0.09 mg. per cm$^2$ of zinc silicate, manganese activated; and about 0.46 mg. per cm$^2$ of yttrium-europium oxide. The yttrium-europium oxide component of this blend provides the red component of the composite spectral energy distribution. This component gives the blend its well balanced light output and very high color rendering capacity. The rare-earth metals yttrium and europium are expensive and the use of large amounts of this material makes the blend expensive.

It has been discovered that when the strontium magnesium phosphate, the strontium blue halophosphate, and the zinc silicate are blended together and applied as a first layer and then coated with a distinct layer of yttrium-europium oxide that the same spectral energy distribution for the combination can be produced with about one-fifth of the amount of yttrium-europium oxide as would be required were a single layer blend of these phosphors utilized. The first layer in an amount of about 4.49 mg. per cm$^2$ coating weight is applied by mixing the compositions in a lacquer with nitrocellulose binder. In the blend about 41 percent by weight of the dry luminescent material is strontium magnesium phosphate, 55 percent by weight is strontium blue halophosphate, and about 2 percent by weight is zinc silicate. After this first layer is dry, another fairly uniform layer of yttrium-europium oxide with a coating weight of 0.09 mg. per cm$^2$ is applied using a lacquer with ethylcellulose binder. The combination is heated in air to remove the volatile binders, and the distinct top layer of yttrium-europium oxide luminescent material is maintained. The spectral energy distribution for this improved lamp is substantially the same as the single layer blended lamp; however, whereas yttrium-europium oxide made up about 10 percent by weight of the luminescent material in the single layer blend, in the embodiments of the invention it accounts for only about 2 percent by weight of the luminescent material in this double layer blend.

Figure 4:
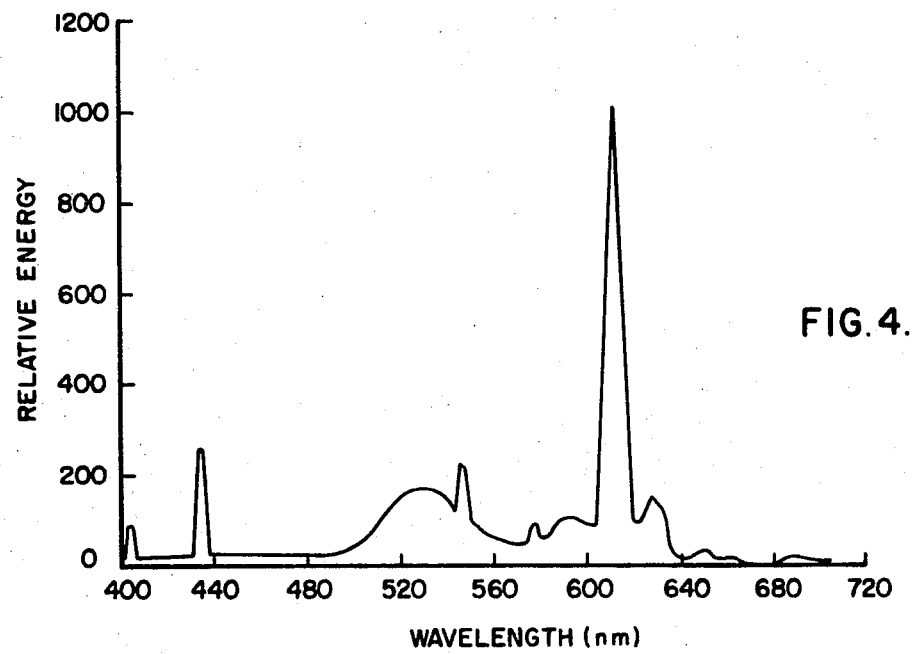
FIG. 4 is a graph of the spectral energy distribution for another embodiment of the present invention, with relative emission energy plotted against wavelength in nanometers.

In another example of the present invention, the spectral energy distribution seen in FIG. 4, form a 40 watt fluorescent lamp constructed per the invention, is what can be termed an "incandescent color." The color temperature is about 2800° Kelvin, and the CIE chromaticity coordinates are $x=0.456$, $y=0.415$, $z=0.129$.

In providing this "incandescent color" spectral energy distribution according to the present invention a first luminescent layer is deposited of a blend of the well-known phosphors manganese activated zinc orthosilicate, and calcium tungstate. For a 40 watt, T-12 tubular envelope and using a lacquer containing nitrocellulose binder as is well known in the art, the first layer is applied comprising about 1.77 mg. per cm² of the manganese activated zinc orthosilicate, and about 0.92 mg. per cm² of calcium tungstate. After this first layer dries a distinct top layer comprising about 0.77 mg. per cm² of yttrium-europium oxide is applied using a lacquer containing ethylcellulose binder. The binders are volatized by lehring the coated envelope as is well known, and the lamp fabrication is completed. This lamp during operation exhibits a spectral energy distribution as shown in FIG. 4.

In order to duplicate the desired spectral energy distribution using a single layer blend of these same materials the amount of materials required are about 2.3 mg. per cm² of yttrium-europium oxide, about 0.85 mg. per cm² of $ZnSiO_4$:Mn, and about 0.46 mg. per cm² of calcium tungstate. Thus, the requisite amount of the expensive yttrium-europium oxide is reduced to about one-third by utilizing the present invention.

Any number of blend combinations can be used in practicing the present invention. It has been shown in copending application S.N. 742,291 filed July 3, 1968, owned by the present assignee that maximum visible lumens and color rendition can be achieved by providing narrow half-width emission about three specific regions of the visible spectrum. A great deal of phosphor research has been directed to finding such narrow half-width emitters in the desired regions. As is well known the rare-earth metals tend to fluoresce with line or narrow band emission, so many of the new phosphors which have blend applications include rare-earth metal compounds. These phosphors are generally very expensive and thus of limited commercial practicality when used conventionally in homogeneous blends. The present invention allows a significant reduction in the required amount of a particular expensive phosphor which has a particular spectral energy distribution to complete a very efficient blended light combination.

While specific binders are described in the preferred embodiments for use in applying distinct phosphor layers, it is apparent to one skilled in the art that the only requirement for insuring distinct phosphor layers is to select a lacquer containing a binder which is sufficiently stable when dried that the application of successive phosphor containing paints does not break down the already dried layer or layers. The coating techniques used are standard in the art.

In practicing the present invention with obvious modifications, such as with the other combinations of luminescent materials the coating densities will be varied for each particular combination to provide the desired overall spectral energy distribution for the combination.

In general, a double-layer combination rather than three or more distinct layers is preferred because this involves less manufacturing handling.

Figure 2:
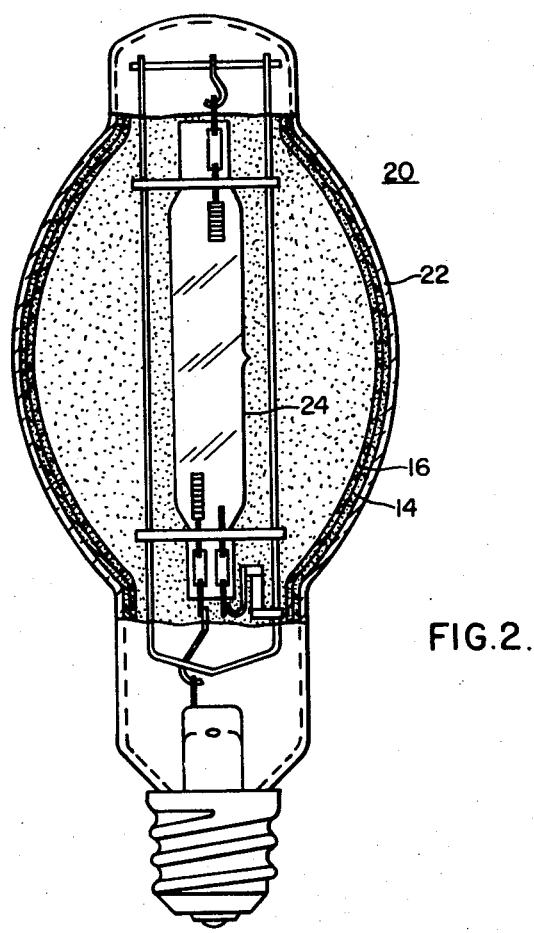
FIG. 2 is an elevation partly in section of a standard high-pressure mercury vapor arc tube enclosed in a bulbous outer envelope which is coated per the invention.

It is of course preferable when utilizing the present invention with a high-pressure mercury vapor device 20 shown in FIG. 2 to use phosphors which have a very good temperature dependence characteristic. The distinct phosphor layers are disposed on the interior surface of the outer glass bulb 22 which is hermetically sealed about the art tube 24.

Numerous combinations of phosphor materials can be suggested with which to practice the present invention. Other high cost phosphors which have spectral energy distributions which suggest their use as the top layer in a blend include, magnesium fluorogermanate, manganese-activated calcium digallate, europium-activated indium borate. The phosphor blends recited are merely specific examples of the present invention, and the invention is not to be limited thereto.

As another example, if three phosphors are required to generate a desired spectral energy distribution, and if one phosphor is very expensive, another moderately expensive and the third inexpensive, the preferred procedure would be to deposit the phosphors onto the glass substrate in three distinct layers in the order: inexpensive, moderately expensive and very expensive.

We claim as our invention:

1. An improved discharge lamp combination wherein predetermined amounts of distinct luminescent compositions which are of differing expense and which have different predetermined spectral energy distributions are utilized to provide a desired resultant spectral energy distribution for the combination, said combination comprising a source of ultraviolet radiation positioned relative to a luminescent coating disposed on a light transmissive substrate whereby said ultraviolet radiation excites said luminescent compositions to luminesce with the resultant blended emission transmitted through said substrate, the improvement which comprises disposing said luminescent compositions as a plurality of uniform layers on said substrate, with a base layer of the less expensive luminescent composition, and at least one other layer of the more expensive luminescent composition coated thereon and disposed to be first impinged upon by said ultraviolet radiation, so that during operation of said combination said more expensive luminescent composition absorbs a greater proportion of said ultraviolet radiation and correspondingly emits at an increased fluorescent intensity whereby a lesser amount of this more expensive luminescent composition is required, while maintaining the desired resultant spectral energy distribution for the combination.

2. The combination as specified in claim 1, wherein the combination comprises a conventional elongated, tubular, low-pressure, mercury discharge lamp, and wherein said plurality of distinct luminescent layers is disposed on the interior surface of the envelope of the lamp.

3. The combination as specified in claim 1, wherein said combination comprises a conventional elongated, tubular, high-pressure, mercury discharge lamp enclosed within a bulbous outer envelope, and wherein said plurality of distinct luminescent layers is disposed on the interior surface of said outer envelope.

4. The combination as specified in claim 1, wherein said base layer of less expensive luminescent composition comprises a blend of predetermined amounts of strontium-magnesium phosphate, tin-activated, strontium blue halophosphate and zinc silicate, manganese activated, and said other layer of more expensive luminescent composition comprises yttrium-europium oxide.

5. The combination as specified in claim 1, wherein said base layer of less expensive luminescent composition comprises a blend of predetermined amounts of manganese activated zinc orthosilicate and calcium tungstate, and said other layer of more expensive luminescent composition comprises yttrium-europium oxide.

6. The combination as specified in claim 4, wherein the weight ratios of said strontium-magnesium phosphate, said halophosphate, said silicate, and said yttrium-europium oxide are about 41:55:2:2.

7. The combination as specified in claim 5, wherein the weight ratios of said orthosilicate, said tungstate and said yttrium-europium oxide are about 1.77:0.92:0.77.